(12) United States Patent
Katoh et al.

(10) Patent No.: US 8,598,755 B2
(45) Date of Patent: Dec. 3, 2013

(54) ELECTRIC ROTARY ACTUATOR

(75) Inventors: Yoshinobu Katoh, Toyohashi (JP);
Yosuke Nishimura, Kariya (JP);
Atsushi Ando, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 309 days.

(21) Appl. No.: 13/047,084

(22) Filed: Mar. 14, 2011

(65) Prior Publication Data

US 2011/0221293 A1 Sep. 15, 2011

(30) Foreign Application Priority Data

Mar. 15, 2010 (JP) ................... 2010-057000

(51) Int. Cl.
*H02K 7/116* (2006.01)
(52) U.S. Cl.
USPC ............................... 310/83; 310/89
(58) Field of Classification Search
CPC ............................ H02K 1/187; H02K 1/2786
USPC ..................... 310/83; 475/149–157
See application file for complete search history.

(56) References Cited

U.S. PATENT DOCUMENTS 5,677,582 A * 10/1997 Lutz et al. ................... 310/75 R
6,104,112 A * 8/2000 Vanjani ........................ 310/64
6,977,453 B2 * 12/2005 Yoda et al. ............... 310/156.46

FOREIGN PATENT DOCUMENTS

JP 2004-274838 9/2004
JP 2008-6888 1/2008

* cited by examiner

*Primary Examiner* — Burton Mullins
*Assistant Examiner* — Eric Johnson
(74) *Attorney, Agent, or Firm* — Oblon, Spivak, McClelland, Maier & Neustadt, L.L.P.

(57) ABSTRACT

A housing is provided with a partition wall portion that partitions an inner space of the housing into an electric motor accommodating space and a speed reducer accommodating space. The partition wall portion fixes a gear that constitutes a speed reducer. In addition, the partition wall portion has a housing boss portion, and an inner stator is fixed to the housing boss portion. Thus, heat generated by the inner stator is dissipated to the outside through the housing boss portion and the partition wall portion.

9 Claims, 3 Drawing Sheets

ELECTRIC ROTARY ACTUATOR

INCORPORATION BY REFERENCE/RELATED APPLICATION

This application claims priority to Japanese Patent Application No. 2010-057000 filed on Mar. 15, 2010 the disclosure of which, including the specification, drawings and abstract, is incorporated herein by reference in its entirety.

BACKGROUND OF THE INVENTION

1. Field of the Invention

The invention relates to an electric rotary actuator that includes an electric motor and a speed reducer.

2. Discussion of Background

In related art, there is an actuator that employs an outer rotor electric motor as described in Japanese Patent Application Publication No. 2004-274838 (JP-A-2004-274838) and Japanese Patent Application Publication No. 2008-6888 (JP-A-2008-6888). In an outer rotor electric motor, a stator that serves as a heat source is located on the inner side of a rotor. Therefore, it is important to ensure a heat dissipation path from the stator.

The actuator described in JP-A-2004-274838 is formed so that fins extending in the axial direction are provided on an opposite side of an inner stator in the axial direction from a speed reducer to thereby exhibit a heat dissipation effect on the inner stator. In the actuator described in JP-A-2008-6888, an inner stator is fixed to a motor cover provided on an opposite side from a speed reducer to thereby dissipate heat from the stator that serves as a heat source to the outside via the motor cover.

However, in the actuator described in JP-A-2004-274838, the fins are formed to extend outward in the axial direction, so the length of the actuator in the axial direction increases. In addition, in the actuator described in JP-A-2008-6888, the motor cover needs to have a sufficient thickness in order to exhibit a heat dissipation effect. Therefore, when the thickness of the motor cover is reduced in order to reduce the axial size and the weight, heat dissipation performance decreases, so it is difficult to obtain a required heat dissipation effect.

SUMMARY OF INVENTION

The invention is made in the light of the above-described circumstances, and it is an object of the invention to provide an electric rotary actuator that, when an outer rotor electric motor is employed, is able to improve the heat dissipation effect while reducing the axial size and the weight.

According to a feature of an example of the invention, a partition wall portion that partitions an inner space into an electric motor accommodating space and a speed reducer accommodating space is used as a heat dissipation path for an inner stator. At least one gear that constitutes the speed reducer is fixed to the partition wall portion, so the partition wall portion needs to have a stiffness corresponding to torque received via the at least one gear. Therefore, the partition wall portion originally has a reasonable thickness, so it is possible to exhibit a sufficient heat dissipation effect.

According to another feature of an example of the invention, the electric rotary actuator may further include a support body portion that has a hollow disc shape, an inner periphery of which is fixed to the housing, and that is arranged on a radially outer side of the partition wall portion.

According to a further feature of an example of the invention, the electric rotary actuator may further include a rotation angle detector that is provided at a position on a radially inner side of the housing boss portion and on a radially inner side of the inner stator, and that detects a rotation angle of the motor output shaft with respect to the housing.

According to another feature of the invention, by way of example, the electric rotary actuator may further include a motor cover that covers a portion of the electric motor accommodating space, which is on the other axial side, and that is fixed to the housing body, wherein the motor output shaft may be rotatably supported by the motor cover via a first bearing, and may be rotatably supported by the partition wall portion or an output shaft of the speed reducer via a second bearing.

Further by way of example, according to another aspect of the invention, the electric rotary actuator may further include a motor cover that covers a portion of the electric motor accommodating space, which is on the other axial side, and that is fixed to the housing body, wherein the thickness of the motor cover may be smaller than the thickness of the partition wall portion.

According to a further feature of an example of the invention, the outer rotor coupling portion may include a rotor coupling disc portion that has a hollow disc shape and that is connected to the outer rotor at a portion of an outer periphery, which is on the one axial side; and a rotor coupling boss portion that has a cylindrical shape so as to extend from an inner periphery of the rotor coupling disc portion toward the one axial side, and that is connected to an outer peripheral surface of the motor output shaft. At least part of the rotor coupling boss portion is arranged on a radially inner side of the inner stator.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
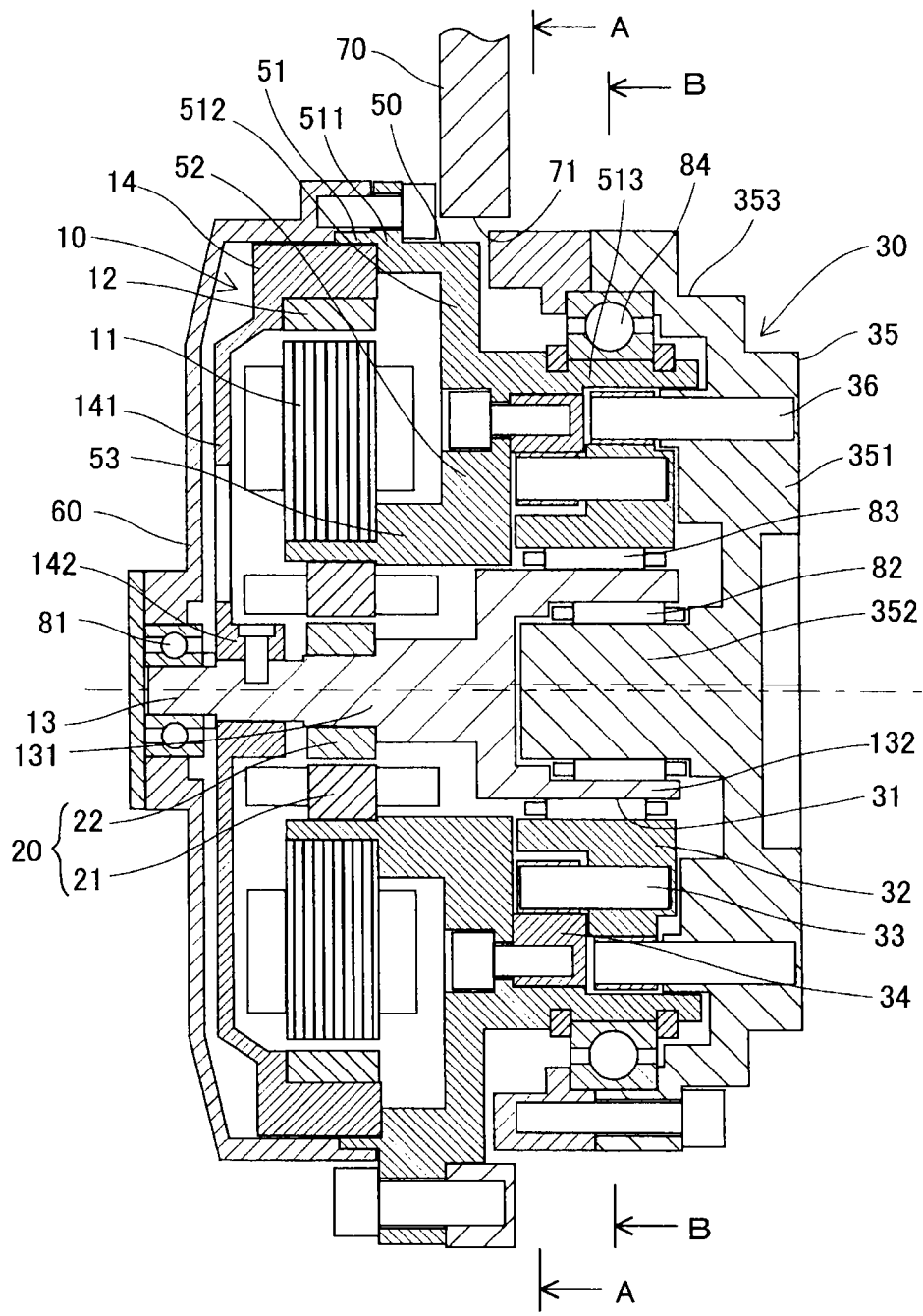
FIG. 1 is an axial sectional view of an electric rotary actuator.
Figure 2:
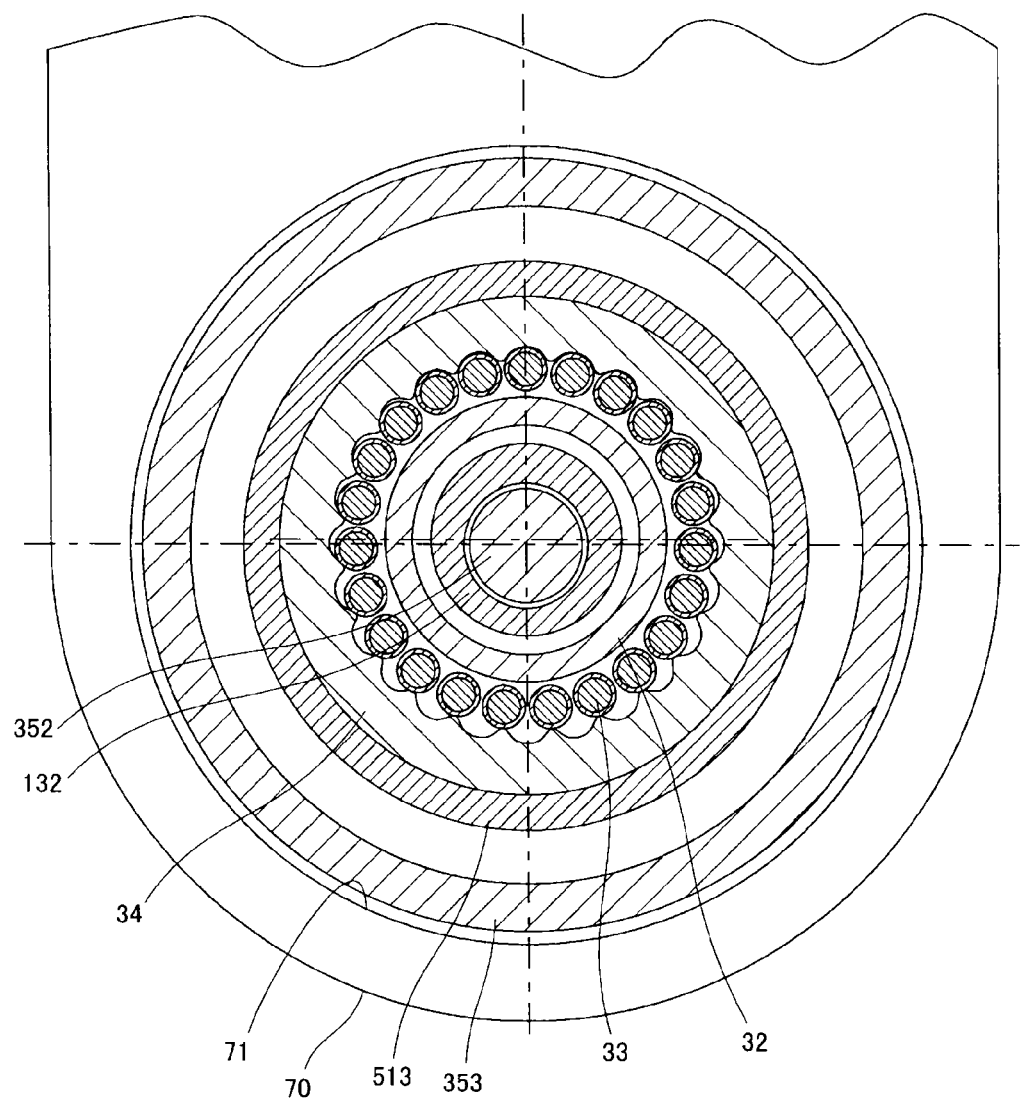
FIG. 2 is a sectional view taken along the line A-A in FIG. 1.
Figure 3:
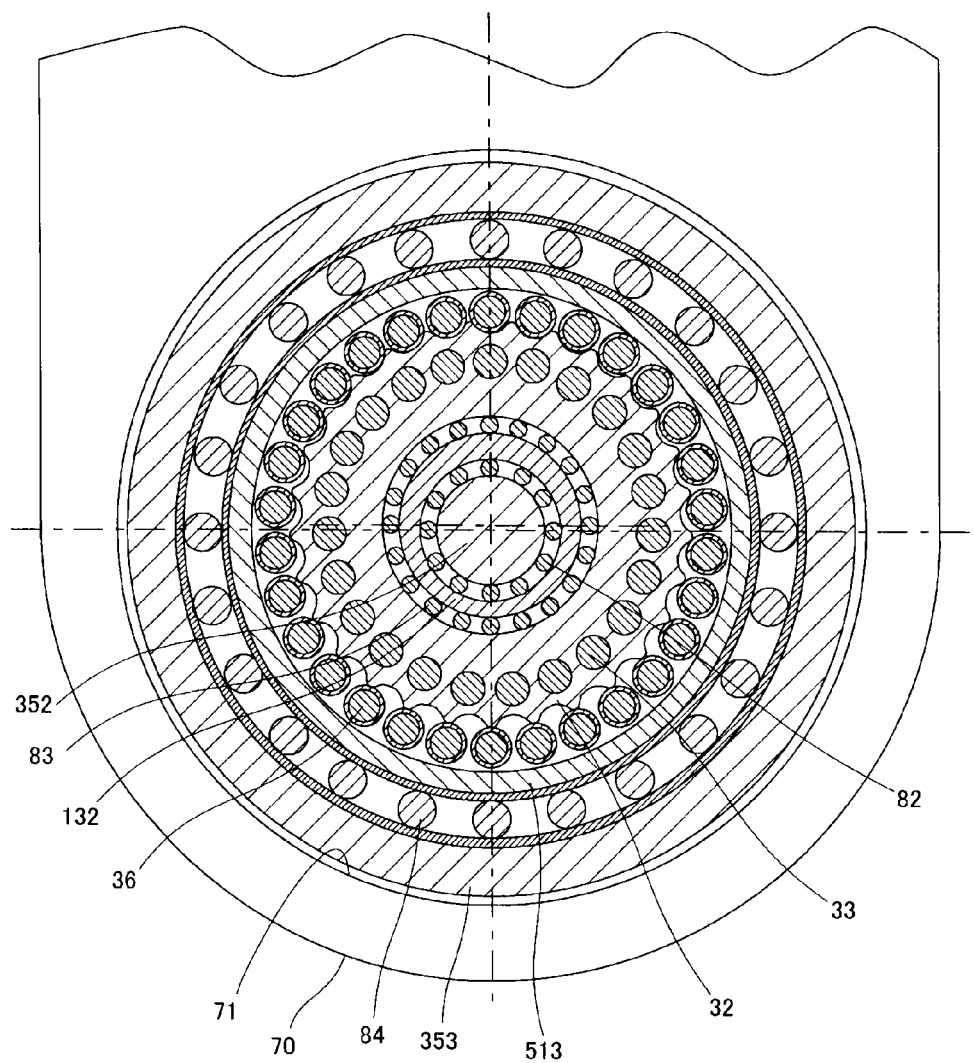
FIG. 3 is a sectional view taken along the line B-B in FIG. 1.

Hereinafter, an embodiment of an electric rotary actuator according to the invention will be described with reference to FIG. 1 and FIG. 2. As shown in FIG. 1, the electric rotary actuator includes an electric motor 10, a rotation angle detector 20, a speed reducer 30, a housing 50, a motor cover 60 and a support body portion 70. The rotation angle detector 20 detects the rotation angle of a motor output shaft 13 of the electric motor 10. The speed reducer 30 is integrally coupled to a one axial side portion (right side portion in FIG. 1) of the electric motor 10. The housing 50 accommodates part of the electric motor 10 and speed reducer 30.

The housing 50 is made of a metal having a high thermal conductivity, such as aluminum and steel. The housing 50 has a housing body 51, a partition wall portion 52 and a housing boss portion 53. The housing body 51 has a stepped cylindrical shape. Specifically, the housing body 51 is formed of a large-diameter cylindrical motor housing body 511, a hollow disc-shaped step surface portion 512 and a speed reducer housing body 513. The step surface portion 512 extends radially inward from an end surface of the motor housing body 511, which is on one axial side (right side in FIG. 1). The speed reducer housing body 513 extends from a radial inner periphery of the step surface portion 512 toward the one axial side (right side in FIG. 1), and is formed in a cylindrical shape that is smaller in diameter than the motor housing body 511.

The partition wall portion 52 partitions an inner space of the housing body 51 into an electric motor accommodating space (left side space in FIG. 1) and a speed reducer accommodating space (right side space in FIG. 1). Specifically, the partition wall portion 52 has a hollow disc shape, and is integrally formed with the housing body 51 so as to extend radially inward from the step surface portion 512 of the housing body 51. That is, the electric motor accommodating space defined by the partition wall portion 52 is located on the other axial side (left side in FIG. 1) of the inner space of the housing body 51, and is a space in which the electric motor 10 is accommodated. In addition, the speed reducer accommodating space defined by the partition wall portion 52 is located on one axial side (right side in FIG. 1) of the inner space of the housing body 51, and is a space in which the speed reducer 30 is accommodated.

The housing boss portion 53 is formed in a cylindrical shape that is smaller in diameter than the motor housing body 511, and is provided so as to axially extend from a surface of the partition wall portion 52, which is on the electric motor accommodating space side. Here, the speed reducer housing body 513 is used as a member that fixes a fixed internal gear 34 of the speed reducer 30 (described later). Therefore, the speed reducer housing body 513 withstands torque received by the fixed internal gear 34 as reaction force. Thus, the housing 50 is formed to be sufficiently thick in order to have a sufficient stiffness so as to be able to withstand the reaction force of torque. Note that the thickness of the housing 50, particularly, the thickness of the partition wall portion 52 and the thickness of the housing boss portion 53, are sufficiently larger than the thickness of the motor cover 60 (described later).

The motor cover 60 is formed to have a flange at the outer periphery of the disc shape. The flange portion of the motor cover 60 is fixed to an end portion of the motor housing body 511, which is on the other axial side (left side in FIG. 1). Then, the motor cover 60 covers a portion of the electric motor accommodating space, which is on the other axial side. The motor cover 60 is made of a metal, such as aluminum and steel. Then, as described above, the thickness of the motor cover 60 is made sufficiently smaller than the thickness of the housing 50. Thus, the weight and axial size of the actuator can be reduced.

The support body portion 70 is fixed to the housing 50, and is fixed to another member (not shown). The support body portion 70 has a circular hole 71. The partition wall portion 52 of the housing 50 is located in the circular hole, and then the support body portion 70 is fastened to the motor housing body 511 by a bolt. Here, the support body portion 70 is made of a metal having a high thermal conductivity, such as aluminum and steel.

The electric motor 10 is an outer rotor electric motor. Because an outer rotor electric motor is used as the electric motor 10, the outer rotor electric motor 10 is able to exhibit high torque performance for its outside diameter. The electric motor 10 is arranged in the motor accommodating space that is located on the inner side of the motor housing body 511 and on the other axial side (left side in FIG. 1) of the partition wall portion 52. The electric motor 10 includes an inner stator 11, an outer rotor 12, the motor output shaft 13 and an outer rotor coupling portion 14.

The inner stator 11 is fixed to the outer peripheral surface of the housing boss portion 53. The inner stator 11 is formed of a core and a coil wound around the core. The outer rotor 12 is made of a magnet and formed in a cylindrical shape. The outer rotor 12 is arranged radially between the outer peripheral surface of the inner stator 11 and the inner peripheral surface of the motor housing body 511 and is spaced apart from both the outer peripheral surface of the inner stator 11 and the inner peripheral surface of the motor housing body 511 so as to face the outer peripheral surface of the inner stator 11. That is, as current is supplied to the coil of the inner stator 11, the outer rotor 12 rotates relative to the inner stator 11 and the motor housing body 511.

The motor output shaft 13 has a shaft-like shape and is provided along a central axis. More specifically, the motor output shaft 13 is formed of a motor shaft portion 131 and a speed reducer cylindrical portion 132 that are integrally and coaxially formed with each other. The motor output shaft 13 is inserted on the inner peripheral side of both the housing boss portion 53 and the partition wall portion 52, and is rotatable relative to the housing 50. An axial other end (left end in FIG. 1) of the outer peripheral surface of the motor shaft portion 131 of the motor output shaft 13 is rotatably supported by the motor cover 60 via a first bearing 81. Furthermore, the inner peripheral surface of the speed reducer cylindrical portion 132 of the motor output shaft 13 is rotatably supported by a speed reducer output shaft 35 via a second bearing 82.

The outer rotor coupling portion 14 has a substantially disc shape. The outer rotor coupling portion 14 is arranged on the other axial side (left side in FIG. 1) of both the inner stator 11 and the housing boss portion 53, and couples the outer rotor 12 to the outer peripheral surface of the motor shaft portion 131 of the motor output shaft 13. That is, the outer rotor coupling portion 14 has the function of transmitting the rotation of the outer rotor 12 with respect to the housing 50 to the motor output shaft 13.

More specifically, the outer rotor coupling portion 14 has a rotor coupling disc portion 141 and a rotor coupling boss portion 142. The rotor coupling disc portion 141 has a hollow disc shape, and a one axial side portion of the outer periphery of the rotor coupling disc portion 141 is connected to the outer rotor 12. The rotor coupling boss portion 142 has a cylindrical shape so as to extend from the inner periphery of the rotor coupling disc portion 141 toward the one axial side (right side in FIG. 1), and is connected to the outer peripheral surface of the motor shaft portion 131 of the motor output shaft 13. That is, the rotor coupling boss portion 142 is formed so as not to protrude toward the other axial side from a surface of the rotor coupling disc portion 141, which is on the other axial side. Then, part of the rotor coupling boss portion 142 is arranged on the radially inner side of the inner stator 11.

The rotation angle detector 20 detects the rotation angle of the motor output shaft 13 with respect to the housing 50, and, for example, a resolver, an encoder, or the like, may be employed as the rotation angle detector 20. The rotation angle detector 20 is provided at a position that is on the radially inner side of the housing boss portion 53 and on the radially inner side of the inner stator 11. More specifically, a stator 21 of the rotation angle detector 20 is fixed to the inner peripheral surface of the housing boss portion 53, and a rotor 22 of the rotation angle detector 20 is fixed to the outer peripheral surface of the motor shaft portion 131 of the motor output shaft 13 so as to radially face the stator 21.

Here, as described above, the inner stator 11 of the electric motor 10 is fixed to the housing boss portion 53, and the housing boss portion 53 rotates relative to the motor output shaft 13. Therefore, it is necessary to form a clearance between the housing boss portion 53 and the motor output shaft 13. Then, the rotation angle detector 20 is arranged by effectively utilizing the clearance. Thus, it is possible to reduce the axial size of the electric rotary actuator.

The illustrated speed reducer 30 is an oscillating internally meshing planetary gear device in which the rotation axis of a planetary gear is located on the radially inner side of the planetary gear. The speed reducer 30 is not limited to an oscillating internally meshing planetary gear, and another type of speed reducer may be applied as the speed reducer 30.

The speed reducer 30 in the present embodiment reduces the speed of rotation of the motor output shaft 13 of the electric motor 10 and outputs the rotation to the speed reducer output shaft 35. The speed reducer 30 includes an eccentric portion 31, an oscillating plate 32, first pins 33, the fixed internal gear 34, the speed reducer output shaft 35 and second pins 36.

The eccentric portion 31 corresponds to an input shaft of the speed reducer 30, and is integrally formed with the outer peripheral surface of the speed reducer cylindrical portion 132 of the motor output shaft 13. The outer peripheral surface of the eccentric portion 31 is formed in a circular sectional shape centered on an eccentric axis that is eccentric from the rotation axis of the motor output shaft 13. That is, as the motor output shaft 13 rotates relative to the housing 50, the eccentric portion 31 revolves around the rotation axis of the motor output shaft 13.

The oscillating plate 32 has a disc shape, and is fitted around the outer peripheral surface of the eccentric portion 31 via a third bearing 83. Thus, the oscillating plate 32 is able to revolve as the eccentric portion 31 revolves around the rotation axis of the motor output shaft while rotating relative to the eccentric portion 31. That is, the oscillating plate 32 is able to rotate on its axis. Furthermore, the oscillating plate 32 has a plurality of through-hole each having a circular section. The plurality of through-hole are aligned along a circle centering on the eccentric axis of the eccentric portion 31. Moreover, the outer periphery of the oscillating plate 32 has epitrochoidal external teeth in the circumferential direction centering on the eccentric axis of the eccentric portion 31 at a predetermined pitch.

The first pins 33 are respectively fitted in the through-holes of the oscillating plate 32 so as to protrude from a surface of the oscillating plate 32, which is on the other axial side (left side in FIG. 1). The first pins 33 each have a columnar shape. That is, when the first pins 33 are fitted in the oscillating plate 32, the oscillating plate 32 and the first pins 33 form an external gear having a plurality of pin-like external teeth.

The fixed internal gear 34 has an annular shape, and has hypotrochoidal internal teeth formed at a predetermined pitch. The fixed internal gear 34 is fixed to a surface of the partition wall portion 52 of the housing 50, which is on the one axial side (right side in FIG. 1). The central axis of the internal teeth of the fixed internal gear 34 coincides with the rotation axis of the motor output shaft 13. The number of the internal teeth is slightly larger than the number of the first pins 33. Then, the internal teeth of the fixed internal gear 34 are engaged with the first pins 33. That is, because there is a difference between the number of the internal teeth of the fixed internal gear 34 and the number of the first pins 33, when the oscillating plate 32 to which the first pins 33 are fixed revolves around the rotation axis of the motor output shaft 13, the oscillating plate 32 differentially rotates relative to the fixed internal gear 34 based on the difference in the number of teeth in a direction opposite to the direction of the revolving motion.

Here, the fixed internal gear 34 engages the first pins 33 to withstand the reaction force of torque generated through the rotation of the motor output shaft 13. Thus, the fixed internal gear 34 needs to have a reasonable stiffness. In addition, the partition wall portion 52 that fixes the fixed internal gear 34 also withstands the reaction force of the torque similarly. Therefore, the partition wall portion 52 needs to have a reasonable stiffness.

The speed reducer output shaft 35 serves as an output shaft of the speed reducer 30, and outputs rotation at a speed that is reduced from the speed of rotation of the motor output shaft 13. The speed reducer output shaft 35 is supported so as to be rotatable relative to the housing 50 and the motor output shaft 13. More specifically, the speed reducer output shaft 35 is formed of an output disc portion 351, an inserting shaft portion 352 and a support flange portion 353.

The output disc portion 351 is provided so as to cover one axial side portions of the eccentric portion 31, oscillating plate 32, first pins 33 and fixed internal gear 34, which constitute the speed reducer 30. The output disc portion 351 has a plurality of through-hole each having a circular section. The plurality of through-hole are aligned along a circle centered on the rotation axis of the motor output shaft 13. The inserting shaft portion 352 is provided so as to axially protrude from an axial center portion of a surface of the output disc portion 351, which is on the other axial side (left side in FIG. 1). The inserting shaft portion 352 is arranged on the radially inner side of the speed reducer cylindrical portion 132 of the motor output shaft 13 via the second bearing 82. That is, the motor output shaft 13 is supported rotatably by the outer peripheral surface of the inserting shaft portion 352 via the second bearing 82.

The support flange portion 353 has a substantially cylindrical shape, and is provided so as to extend from the radially outer periphery of the output disc portion 351 toward the other axial side (left side in FIG. 1). The inner peripheral surface of the support flange portion 353 is supported rotatably by the speed reducer housing body 513 of the housing 50 via a fourth bearing 84.

The second pins 36 are respectively fitted in the through-holes of the output disc portion 351 of the speed reducer output shaft 35, and are provided so as to protrude from a surface of the output disc portion 351, which is on the other axial side (left side in FIG. 1). The second pins 36 each have a columnar shape. That is, when the second pins 36 are fitted in the output disc portion 351 of the speed reducer output shaft 35, the speed reducer output shaft 35 and the second pins 36 form an internal gear having a plurality of pin-like external teeth. The number of the second pins 36 is larger than the number of the epitrochoidal external teeth formed at the outer periphery of the oscillating plate 32. Then, the second pins 36 are engaged with the external teeth formed at the outer periphery of the oscillating plate 32.

That is, when the oscillating plate 32 is revolving about the rotation axis of the motor output shaft 13 but is not rotating on its axis, the speed reducer output shaft 35 to which the second pins 36 are fixed differentially rotates based on the difference in the number of teeth in the direction in which the oscillating plate 32 revolves, because there is a difference in the number of teeth between the epitrochoidal external gear formed at the outer periphery of the oscillating plate 32 and the second pins 36.

Actually, the oscillating plate 32 not only revolves about the rotation axis of the motor output shaft 13 but also rotates on its axis. Then, the direction in which the oscillating plate 32 rotates on its axis is opposite to the direction in which the speed reducer output shaft 35 rotates relative to the oscillating plate 32. Thus, the speed reducer output shaft 35 provides rotation that is reversed by the amount of rotation of the speed reducer output shaft 35 relative to the oscillating plate 32, from the rotation of the oscillating plate 32 on its axis. That is, the speed reducer output shaft 35 rotates at a speed that is further reduced from the speed of rotation of the oscillating plate 32.

In the above-described electric rotary actuator, the coil of the inner stator 11 of the electric motor 10 is a heat source. A heat dissipation path of heat generated by the coil will be described below. The inner stator 11 is fixed to the housing boss portion 53 of the housing 50. Thus, heat generated by the coil of the inner stator 11 is first transferred to the housing boss portion 53.

Subsequently, the housing boss portion 53 is integrally formed with the partition wall portion 52 of the housing 50. Thus, the heat transferred to the housing boss portion 53 is transferred to the partition wall portion 52. Then, the partition wall portion 52 is integrally formed with the housing body 51. In addition, the support body portion 70 is provided on the radially outer side of the partition wall portion 52. Thus, the heat transferred to the partition wall portion 52 is transferred to the housing body 51 and the support body portion 70, and may be dissipated to the outside of the electric rotary actuator.

Here, the housing boss portion 53, the partition wall portion 52 and the housing body 51 that form the heat dissipation path each have a reasonable thickness and a high thermal conductivity. This is because the partition wall portion 52 needs to have a sufficient stiffness for withstanding the reaction force of torque since the fixed internal gear 34 that constitutes the speed reducer 30 is fixed to the partition wall portion 52. Therefore, the housing boss portion 53 and the partition wall portion 52 each originally have a certain thickness. For this reason, heat generated by the inner stator 11 is dissipated through the housing boss portion 53 and the partition wall portion 52 to thereby make it possible to reliably exhibit a heat dissipation effect.

Furthermore, heat generated by the inner stator 11 is dissipated through the partition wall portion 52. Therefore, it is not necessary to increase the thickness of the motor cover 60 that covers the inner stator 11 unlike the related art. Thus, it is possible to reduce the axial size and weight of the electric rotary actuator. That is, when torque performance is improved by employing an outer rotor electric motor, it is possible to improve a heat dissipation effect while reducing the axial size and weight of the electric rotary actuator.

What is claimed is:

1. An electric rotary actuator with a first axial end and a second axial end, comprising:
   an electric motor;
   a speed reducer that is integrally coupled to the electric motor at a first axial end side of the electric motor; and
   a housing that accommodates the electric motor and the speed reducer, wherein
   the housing includes
      a housing body having a stepped cylindrical shape, the housing body including a cylindrical motor housing body, a step surface portion extending radially inward from a first axial end side of the cylindrical motor housing body, and a speed reducer housing body extending from a radial inner periphery of the step surface portion toward the first axial end;
      a partition wall portion that is annularly formed integrally with an inner peripheral surface of the housing body so as to present a first surface facing the first axial end and a second surface facing the second axial end, and that partitions an inner space of the housing body into an electric motor accommodating space that is located on a second axial end side of the partition wall portion and that accommodates the electric motor, and a speed reducer accommodating space that is located on a first axial end side of the partition wall portion and that accommodates the speed reducer; and
      a cylindrical housing boss portion that extends from the second surface of the partition wall portion toward the second axial end, which is on an electric motor accommodating space side,
   the electric motor is an outer rotor electric motor,
   the electric motor includes
      an inner stator that is fixed to an outer peripheral surface of the housing boss portion, an inner peripheral surface of the inner stator abutting the outer peripheral surface of the housing boss portion;
      an outer rotor that is arranged radially between an outer peripheral surface of the inner stator and the inner peripheral surface of the housing body so as to be spaced apart from both the outer peripheral surface of the inner stator and the inner peripheral surface of the housing body;
      a motor output shaft that is inserted on an inner peripheral side of both the housing boss portion and the partition wall portion, and that is rotatable relative to the housing; and
      an outer rotor coupling portion that is arranged on the second axial end side with respect to the inner stator and the housing boss portion, that couples the outer rotor and the motor output shaft with each other, and that transmits rotation of the outer rotor to the motor output shaft,
   the speed reducer includes a plurality of gears, is coupled to a first axial end side portion of the motor output shaft, and reduces a speed of rotation of the output shaft through operation of the plurality of gears and then outputs the rotation, and
   at least one of the plurality of gears of the speed reducer is fixed to a portion of the partition wall portion of the housing on the first axial end side, and transmits at least part of the torque transmitted from the motor output shaft to the partition wall portion.

2. The electric rotary actuator according to claim 1, further comprising:
   a support body portion that has a hollow disc shape, an inner periphery of which is fixed to the housing, and that is arranged on a radially outer side of the partition wall portion.

3. The electric rotary actuator according to claim 1, further comprising:
   a rotation angle detector that is provided at a position on a radially inner side of the housing boss portion and on a radially inner side of the inner stator, and that detects a rotation angle of the motor output shaft with respect to the housing.

4. The electric rotary actuator according to claim 1, further comprising:
   a motor cover that covers a portion of the electric motor accommodating space, which is on the second axial end side, and that is fixed to the housing body, wherein
   the motor output shaft is rotatably supported by the motor cover via a first bearing, and is rotatably supported by the partition wall portion or an output shaft of the speed reducer via a second bearing.

5. The electric rotary actuator according to claim 1, further comprising:

a motor cover that covers a portion of the electric motor accommodating space, which is on the second axial end side, and that is fixed to the housing body, wherein the thickness of the motor cover is smaller than the thickness of the partition wall portion.

6. The electric rotary actuator according to claim 1, wherein the outer rotor coupling portion includes a rotor coupling disc portion that has a hollow disc shape and that is connected to the outer rotor at a portion of an outer periphery, which is on the first axial end side; and a rotor coupling boss portion that has a cylindrical shape so as to extend from an inner periphery of the rotor coupling disc portion toward the first axial end, and that is connected to an outer peripheral surface of the motor output shaft, and at least part of the rotor coupling boss portion is arranged on a radially inner side of the inner stator.

7. The electric rotary actuator according to claim 1, wherein a diameter of the speed reducer housing body is less than a diameter of the cylindrical motor housing body.

8. The electric rotary actuator according to claim 1, wherein the speed reducer includes a speed reducer output shaft which is rotatable relative to the housing and the motor output shaft.

9. The electric rotary actuator according to claim 8, wherein the speed reducer output shaft includes a support flange portion at an outer periphery of the speed reducer output shaft, and an inner peripheral surface of the support flange portion is supported rotatably by an outer peripheral surface of the speed reducer housing body via a bearing.

* * * * *